3,180,698
METHOD OF MANUFACTURING ELECTRON TUBES
David B. Williams, Winchester, Mass., assignor to Electronics Corporation of America, Cambridge, Mass., a corporation of Massachusetts
Filed June 6, 1962, Ser. No. 200,575
6 Claims. (Cl. 316—21)

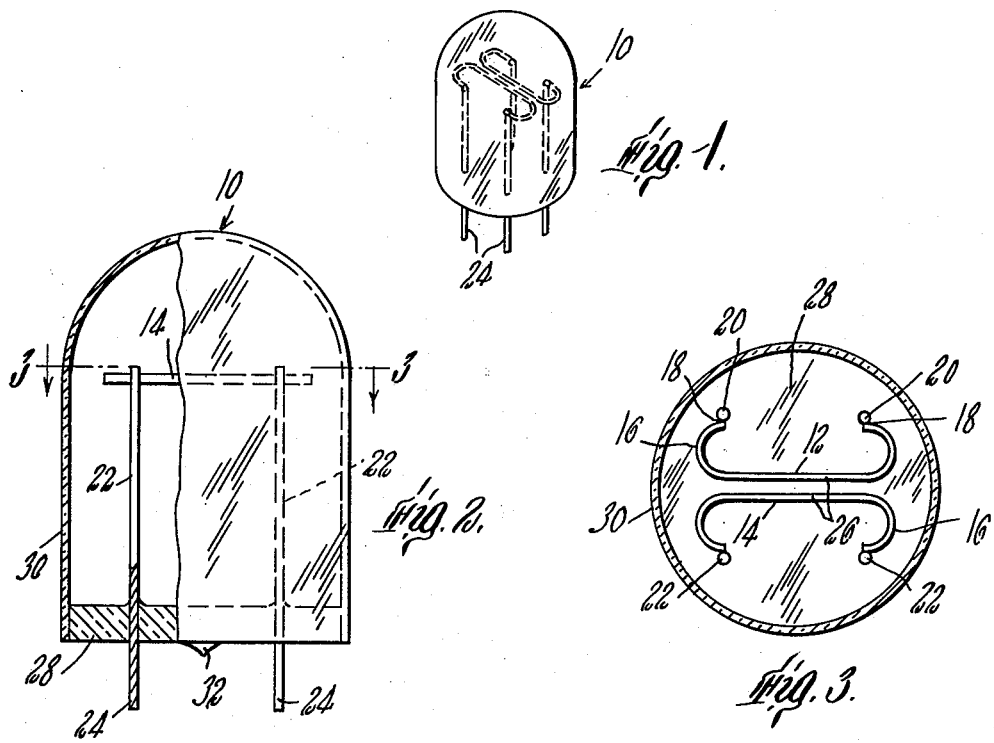
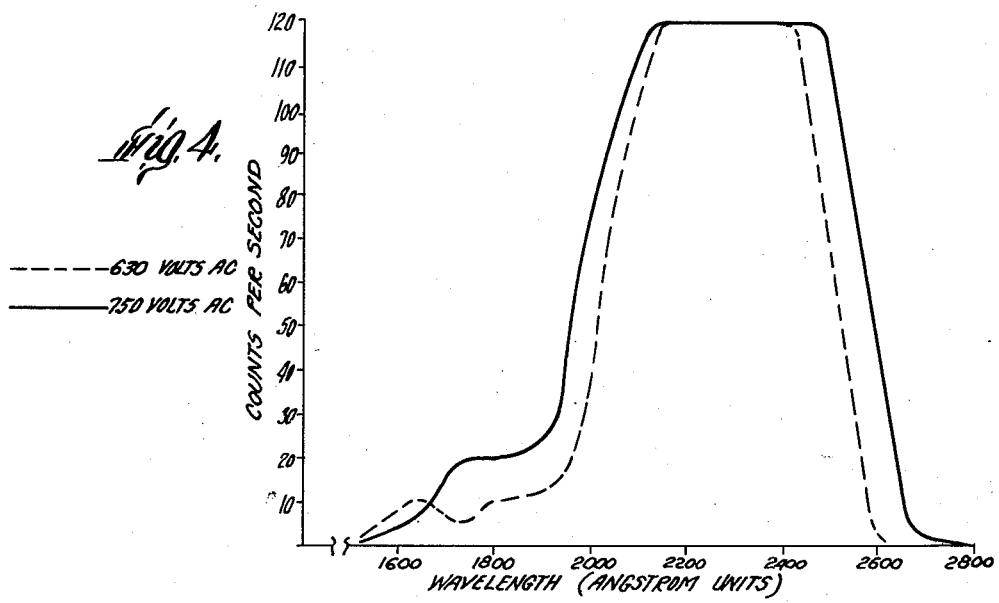

This invention relates to radiation responsive devices and more particularly to improved radiation responsive devices particularly adapted for the detection of ultraviolet radiation and to methods of manufacturing such devices.

Most types of combustion flames include infra-red, visible and ultraviolet wavelength components, and the presence of one of these components is often used as a criterion to determine whether flame is present in a system for supervising the combustion operation. As a high degree of reliability and accurate response is essential in such systems, it is necessary to insure that the source of the sensed wavelength component is the supervised combustion flame and not an extraneous source, such as the sun. Combustion flames have a unique low frequency characteristic which is utilized to provide reliable supervision with infra-red sensing systems for example. It is also known that certain combustion flames have a strong ultraviolet radiation wavelength component in the region below 2800 A. (Angstrom units) and that the wavelength of solar ultraviolet radiation that reaches the earth is above that value. Accordingly, an accurate and reliable response to ultraviolet signals in combustion flames would be obtainable with a suitable ultraviolet radiation detector which has an abrupt cut off in its response at about 2800 A. so that it exhibits no response to extraneous ultraviolet sources such as the sun. Many radiation responsive devices exist in which an electrostatic field created between two electrodes produces an avalanche breakdown when photons impinge on the electrodes and tungsten electrodes theoretically would respond in the well-known Geiger-Muller tube configuration should produce the desired response. However, the theoretically obtainable selective response has been very difficult to obtain in practice.

Accordingly, it is an object of this invention to provide an improved ultraviolet radiation detection tube which is sensitive to ultraviolet radiations such as those found in combustion flames but insensitive to ultraviolet radiations of wavelengths found in solar radiation.

Another object of the invention is to provide a novel and improved method of manufacturing a radiation responsive device.

A further object of the invention is to provide a novel and improved method for processing metal electrodes for use in sensitive electronic equipment.

Still another object of the invention is to provide a novel and improved method of purifying tungsten electrodes for use in ultraviolet radiation sensitive electronic devices.

In accordance with the preferred embodiment of the invention there is provided a photosensitive ultraviolet detector tube having two elongated pure tungsten electrodes which are supported in spaced relation within an envelope transparent to ultraviolet radiation. Precautions known in the art, such as electrolytic polishing of components and care in fabrication, are employed to maintain the high degree of purity of the metal during fabrication of the electrode structure. The envelope is sealed and a highly purified hydrogen gas introduced in the electrode area. The electrodes are then slowly heated by electrical resistance techniques to 1200° C. in this pure hydrogen atmosphere so that gases and metallic contaminants in the tungsten are released from the tungsten for combination with the hydrogen while minimizing the possibility of trapping any impurities in the tungsten electrode structure. After the electrode structure has been maintained at this temeprature for a predetermined period, the structure is rapidly cooled to room temperature to effectivly provide at least a monomolecular layer of pure tungsten on the electrodes. The hydrogen gas carrying the impurities is then completely removed from the envelope (evacuation to a pressure of less than $10^{-5}$ mm. Hg) and the tube filled again with pure hydrogen. The device is then operated under discharge conditions (avalanche breakdown between the tube electrodes) for a second period of time and then the tube is again evacuated. Finally, the tube is again filled with pure hydrogen to a pressure of about 180 mm. Hg and carefully sealed. The resulting tube, when energized to provide an electromagnetic field of sufficient magnitude that avalanche breakdown between the electrodes occurs in response to impingement of photons of the wavelengths of interest on the electrodes, provides an ultraviolet radiation detector having the desired precise cut off characteristics that are necessary to achieve the reliable selective response for fire detection and combustion supervision in general. Thus devices manufactured in accordance with the invention are extremely sensitive to ultraviolet radiation from combustion flames but substantially completely insensitive to solar ultraviolet radiation so that they function as reliable combustion supervision devices.

Other objects, features and advantages of the invention will be seen in the following description of a preferred embodiment of the invention progresses, in conjunction with the drawings, in which:

FIG. 1 is a perspective view of an ultraviolet radiation detector tube constructed in accordance with principles of the invention;

FIG. 2 is a side view partially in section of the U/V radiation detector tube shown in FIG. 1;

FIG. 3 is a sectional view taken along the line 3—3 of FIG. 2 illustrating the relation of the tube envelope to the tube electrodes; and FIG. 4 is a graph indicating the response characteristics of radiation detectors constructed in accordance with the invention.

The ultraviolet radiation detection tube 10 shown in FIG. 1 has two cylindrical wire electrodes 12, 14 of uniform diameter, each having its end portions 16 bent in semicircles with the terminal portions 18 secured by welding to electrode supports 20, 22, the lower ends of which form external tube terminals 24. The intermediate portion 26 of each electrode 12, 14 is a straight member of uniform diameter (about twenty mils) and each portion 26 is secured exactly parallel to the corresponding intermediate portion of the other electrode at a spacing of approximately thirty mils. Both the electrodes 12, 14 and the supports 20, 22 are manufactured of highest purity tungsten commercially available and after they are welded together (employing a platinum flux) the entire electrode structure is suitably cleaned, including the step of electrolytically polishing in a solution of phosphate of soda, so that the entire electrode structure is smooth and relatively free of contaminating substances.

The supports 20, 22 are fixed in a press 28 and the entire electrode structure is then enclosed in a casing of for example a borosilicate glass such as Corning type 9741. During sealing of the press 28 to the envelope 30 a suitable gas such as a non-explosive mixture of nitrogen and hydrogen is passed over the electrode structure to prevent their oxidation.

The sealed envelope is first evacuated through vacuum connection 32 in the center of the press 28 and then filled with highly purified hydrogen ($H_2$) (passed through a palladium filter) to obtain an impurity ratio in the order of one part in $10^{10}$ to a pressure of 180 mm. Hg. Then the electrodes are resistance heated by applying electric current via the terminals 24 to slowly and carefully increase their temperature over a period of about one hour to 1200° C.—a glowing condition. This gradual temperature increase is employed to avoid trapping of impurities within the tungsten during the transition to the glowing condition. The temperature is maintained at this value for fifteen minutes to continue the driving off or release of any impurities in the tungsten metal for combination in the hydrogen atmosphere. The electrodes are then rapidly lowered to room temperature (in about one minute). The electrodes in this condition have a photoelectric sensitivity to the radiation wavelength of interest. The tube is then evacuated to a pressure of less than $10^{-5}$ mm. Hg to remove the contaminant carrying atmosphere, refilled with hydrogen purified by passage through a palladium filter, and subjected to avalanche breakdown by applying a voltage in the order of 700 volts across the electrodes and exposing them to ultraviolet radiation of about 2500 A. in wavelength. Discharging the tube in hydrogen in this manner for one hour before final sealing off and after glowing has been found helpful to achieve the required tube characteristics. This step also is aimed at creating the monomolecular layer of essentially absolutely pure tungsten. Finally, the tube is again evacuated and refilled with highly purified hydrogen (again passed through a palladium filter) to a pressure of approximately 180 millimeters of mercury and the tube is then sealed with care utilizing well known glass blowing techniques.

This tube has substantially no response to ultraviolet radiation above 2800 A. so that it is almost completely insensitive to the solar ultraviolet radiation that reaches the earth while exhibiting a strong response to combustion flame. While this response of pure tungsten and the necessity of providing uniform electrode configuration have been long known in the art, see Hughes and Du Bridge, Photoelectric Phenomena (1932), I have found that subjecting tungsten in glowing condition to a reducing atmosphere provides an improved electric tube component of more easily reproduced characteristics. While the glowing of the electrode components in the reducing atmosphere improves the resulting tube the further step of exposing the electrode to the discharge environment of their intended end use also has been helpful in producing sensitive ultraviolet detectors. The tube constructed in accordance with the invention may be energized in a transformer coupled alternating voltage signal to build up a field of 700 volts between the electrodes one hundred twenty times a second so that any resulting avalanche breakdown is extinguished before the electrodes pass through the next current zero. As the electrodes are symmetrical, either may serve as an electron emitter in response to an impinging radiation of proper wavelength to initiate the avalanche breakdown.

A graph of the response of tubes constructed in accordance with the invention in counts per second plotted against frequency of impinging radiation is shown in FIG. 4. The maximum response occurs at about 2300 A. However, the tube has a saturated output of one hundred twenty counts per second (as a function of the applied sixty cycle signal) over the 2200–2500 A. Below these wavelengths the U/V transmission of the envelope reduces the response and this portion of the characteristic varies according to the type of envelope employed. At the upper end of the curve (about 2600 A.) a sharp cut off in response occurs as a function of the work function of tungsten of the purity achieved with the invention.

Thus the invention provides improved techniques for purifying electrode components and in particular provides an improved radiation responsive device. In accordance with the invention the metallic electronic components are initially carefully cleaned by conventional techniques in this art and then are carefully heated to glowing condition in a reducing atmosphere at a pressure which may vary depending on the degree of previous evacuation of the envelope. The preferred atmosphere is pure hydrogen. In the purification of tungsten electrodes their temperature is gradually increased over a period of at least about one half hour and preferably over a period in the order of one hour. The maximum temperature of the tungsten electrodes during this treatment should be at least about 1000° C. and should not exceed the minimum evaporation temperature of tungsten in this atmosphere which is in the order of 1500° C. The electrodes are maintained in this glowing condition for a substantial fraction of the time employed to raise them to the glowing temperature—fifteen minutes where the temperature increase period is one hour— and then are rapidly cooled. The reducing atmosphere, carrying contaminants driven from the electrodes during the glowing operation, is then removed and replaced with a pure reducing atmosphere—again preferably pure hydrogen. The electrodes prior to final sealing may be operated in discharging condition in the end use manner which may improve the reproducibility of the ultraviolet response of the tube. The resulting electrode components more closely approach the theoretical response of the metal electrode components than has been possible with the best commercial processing techniques of which I am aware. In addition, the processing may be carried out more rapidly and with less specialized equipment.

While a preferred embodiment of the invention has been shown and described, modifications thereof will be obvious to those skilled in the art. Therefore, it is not intended that the invention be limited to the disclosed embodiment or to details thereof and departures may be made therefrom within the spirit and scope of the invention as defined in the claims.

I claim:

1. The method of manufacturing an ultraviolet radiation sensitive electronic tube comprising the steps of placing a pair of spaced, substantially pure tungsten electrode elements within an envelope transparent to ultraviolet radiation of a wavelength in the order of 2500 A., placing a first reducing atmosphere in said envelope and around said electrode elements, gradually heating said electrode elements in the envelope to a glowing condition to release contaminants from said tungsten electrodes for combination with said first reducing atmosphere, rapidly cooling said electrode elements, removing said first reducing atmosphere carrying said released contaminants from said envelope, placing a second reducing atmosphere in said envelope, creating an electromagnetic field between said spaced electrodes and exposing said electrodes to ultraviolet radiation to produce a discharging condition between said electrodes, removing said second reducing atmosphere from said envelope, placing a third reducing atmosphere in said envelope, and sealing said envelope to prevent subsequent entrance of contaminants therein which might impair the operation of said tube.

2. The method as claimed in claim 1 wherein said third reducing atmosphere is palladium-purified hydrogen placed in said envelope to a pressure in excess of about 50 mm. Hg.

3. The method of manufacturing an ultraviolet radiation sensitive electronic tube comprising the steps of placing a pair of spaced, substantially pure tungsten electrode elements within an envelope transparent to ultraviolet radiation of a wavelength in the order of 2500 A., placing a first pure hydrogen atmosphere in said envelope and around said electrode elements, gradually heating said electrode elements in the envelope to a temperature of approximately 1200° C. to release contaminants from said tungsten electrodes for combination with said first atmosphere,
rapidly cooling said electrode elements,
removing said first atmosphere carrying said released contaminants from said envelope,
placing a second pure hydrogen atmosphere in said envelope,
creating an electromagnetic field between said spaced electrodes and exposing said electrodes to ultraviolet radiation to produce a discharging condition between said electrodes,
removing said second atmosphere from said envelope,
placing a third pure hydrogen atmosphere in said envelope,
and sealing said envelope to prevent subsequent entrance of contaminants therein which might impair the operation of said tube.

4. The method of manufacturing an ultraviolet radiation sensitive device comprising the steps of placing a pair of symmetrical elongated tungsten electrode elements in accurately spaced relation in an envelope transparent to ultraviolet radiation of a wavelength in the order of 2500 A.,
placing a first pure hydrogen atmosphere in said envelope around said electrode elements,
gradually heating said tungsten elements to a glowing condition over a period in the order of at least one half hour,
the maximum temperature of each electrode being equal to the other and approximately 1200° C.,
maintaining said tungsten elements in said glowing condition for a substantial fraction of the period of time employed to raise said tungsten elements to said glowing condition,
cooling said tungsten elements to room temperature in approximately one minute,
removing said first hydrogen atmopshere from said envelope,
placing a second pure hydrogen atmosphere in said envelope after removal of said first atmosphere,
creating an electromagnetic field between said electrode elements sufficient to produce avalanche breakdown between said electrode elements when said electrodes are exposed to radiation of a wavelength in the order of 2500 A.,
exposing said envelope to ultraviolet radiation such as to produce avalanche breakdown for a period of about one hour,
and removing said second pure hydrogen atmosphere from said envelope.

5. The method as claimed in claim 4 wherein said electrode elements are heated to said glowing condition by passing electric current through them.

6. The method as claimed in claim 4 wherein said envelope is evacuated to a pressure of at least about $10^{-5}$ mm. Hg to remove said first hydrogen atmosphere.

References Cited by the Examiner
UNITED STATES PATENTS

| | | | |
|---|---|---|---|
| 287,518 | 10/83 | Edison | 316—21 |
| 2,080,925 | 5/37 | Middleton et al. | 316—21 |

FRANK E. BAILEY, *Primary Examiner.*